United States Patent [19]

Sibigtroth et al.

[11] Patent Number: 5,251,304
[45] Date of Patent: Oct. 5, 1993

[54] INTEGRATED CIRCUIT MICROCONTROLLER WITH ON-CHIP MEMORY AND EXTERNAL BUS INTERFACE AND PROGRAMMABLE MECHANISM FOR SECURING THE CONTENTS OF ON-CHIP MEMORY

[75] Inventors: James M. Sibigtroth, Round Rock; Michael W. Rhoades, Austin; George G. Grimmer, Jr., Austin; Susan W. Longwell, Austin, all of Tex.

[73] Assignee: Motorola, Inc., Schaumburg, Ill.

[21] Appl. No.: 589,246

[22] Filed: Sep. 28, 1990

[51] Int. Cl.⁵ .................... G06F 12/00; G06F 12/14
[52] U.S. Cl. .................... 395/375; 395/425; 395/575; 395/800; 380/3; 364/246.6; 364/286.4; 364/DIG. 1; 364/232.9; 364/232.8
[58] Field of Search .............. 395/375, 400, 425, 575, 395/800; 380/3, 4

[56] References Cited

U.S. PATENT DOCUMENTS

| | | | |
|---|---|---|---|
| 4,523,271 | 6/1985 | Levien | 395/575 |
| 4,590,552 | 5/1986 | Guttag et al. | 395/425 |
| 4,975,870 | 12/1990 | Knicely et al. | 395/425 |
| 5,014,191 | 5/1991 | Padgaonkar et al. | 395/425 |
| 5,056,009 | 10/1991 | Mizuta | 395/425 |
| 5,067,077 | 11/1991 | Wakimoto et al. | 395/400 |

*Primary Examiner*—Robert B. Harrell
*Assistant Examiner*—Alpesh M. Shah
*Attorney, Agent, or Firm*—Jonathan P. Meyer; Robert L. King

[57] ABSTRACT

A data processor with memory within a single integrated circuit package provides a programmable "secure mode" of operation to selectively restrict access and protect information stored in its memory. The secure mode of operation is included in addition to a "single chip mode" wherein the data processor accesses both data and instructions strictly from within the single integrated circuit package. An "expanded mode" of operation also exists wherein the data processor may access either internal or external memory for both instructions and data. The secure mode of operation restricts accesses of instructions to memory contained within the single integrated circuit while allowing data accesses to memory either internal or external to the integrated circuit. The secure mode is accomplished by selectively isolating internal data/instruction bus transfer activity from an external data/instruction bus.

2 Claims, 2 Drawing Sheets

INTEGRATED CIRCUIT MICROCONTROLLER WITH ON-CHIP MEMORY AND EXTERNAL BUS INTERFACE AND PROGRAMMABLE MECHANISM FOR SECURING THE CONTENTS OF ON-CHIP MEMORY

FIELD OF THE INVENTION

This invention relates generally to data processors with memory, and more particularly to security of information stored in memory used by data processors.

BACKGROUND OF THE INVENTION

Memory elements contained within an integrated circuit package having a data processor, such as a microcontroller unit (MCU) are typically used to store control programs, data, and other information. Such memory elements include but are not limited to ROM, RAM, EPROM, EAPROM, or EEPROM. There is often a need to prevent read or write accesses to these memory elements for various security reasons. A known security method for protecting unauthorized reading of the contents of memory elements used within a data processor is accomplished with the use of a software programmable bit in a memory configuration register. When the programmable bit is placed in an active state, the bit causes the data processor to operate in one of several possible single-chip modes. In these modes, the data processor is limited by only being able to address on-chip memory for instructions and data, as opposed to addressing memory external to the chip. However, because chip memory space within the chip is typically limited, the instructions and data contained within the chip are also limited in size. If the controller programs or data increase in size within the chip, larger on-chip memory is required to maintain security of the memory elements when operating in a single-chip mode. Another disadvantage with a security feature requiring a single-chip mode of operation is the inability to communicate with any peripheral devices external to the chip. Accordingly, a more general purpose, flexible and inexpensive solution is required for maintaining security of internal memory elements while expanding the microcontroller system.

SUMMARY OF THE INVENTION

Accordingly, there is provided, in one form, a data processing system comprising an integrated circuit for coupling at least one peripheral device thereto. The integrated circuit has memory with programmable security from unauthorized observation of internal processing operations in response to receipt of externally provided signals. The integrated circuit comprises a processing unit for receiving and processing data and instructions from at least one peripheral device by decoding the received instructions and providing a first control signal indicating when the processing unit will receive an instruction. A secure memory is coupled to the processing unit for receiving addresses from the processing unit and providing data or instructions in response thereto. A programmable security device receives a second control signal having a value controlled by a user of the system. The second control signal enables the programmable security and a third control signal is provided in response thereto. An instruction inhibit portion is coupled to both the programmable security device and the processing unit for selectively inhibiting externally provided instructions when the first control signal is asserted and in response to the third control signal.

These and other features, and advantages, will be more clearly understood from the following detailed description taken in conjunction with the accompanying drawings.

DESCRIPTION OF A PREFERRED EMBODIMENT

Figure 1:
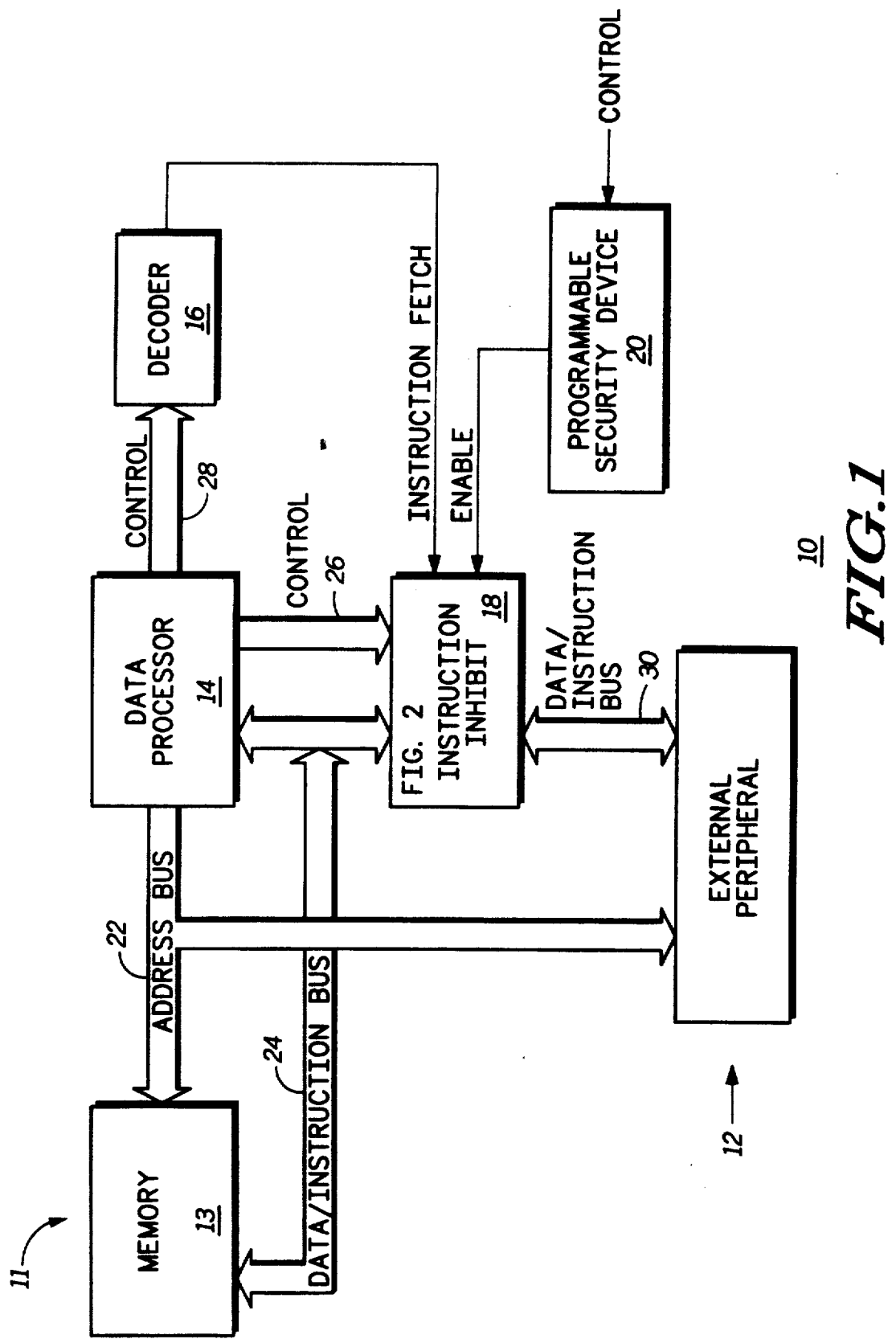
FIG. 1 illustrates in block diagram form a data processing system in accordance with the present invention.

Shown in FIG. 1 is a block diagram of a data processing system 10, comprised generally of a single integrated circuit package portion 11 and a peripheral portion 12 having an external peripheral device. The integrated circuit package portion 11 has a memory 13, a data processor 14, a decoder 16, an instruction inhibit circuit 18, and a programmable security device 20.

In the integrated circuit package portion 11, memory 13 is connected to the data processor 14 with an address bus 22 and a data/instruction bus 24. The data processor 14 is connected to the instruction inhibit circuit 18 by the data/instruction bus 24 and a control bus 26. Control bus 26 is connected from a first control output of the data processor 14 to a first control input of the instruction inhibit circuit 18 and contains two control signals, a "Data Read" signal and a "Data Write" signal. A second control output bus 28 is connected from a second control output of data processor 14 to a control input of decoder 16. An output of decoder 16 is a signal labeled "Instruction Fetch" and is connected to a second control input of the instruction inhibit circuit 18. In the illustrated form, the Instruction Fetch and Data Read signals may not both be active at the same time. The programmable security device 20 has an output for providing a signal labeled "Enable" that is connected to a third control input of the instruction inhibit circuit 18 and is activated in response to an input "Control" signal. The peripheral portion 12 is connected to memory 13 and data processor 14 by address bus 22. Peripheral portion 12 is connected to the instruction inhibit circuit 18 by a data/instruction bus 30.

There are a variety of applications for a data processor system such as data processing system 10 of FIG. 1. One application is in the area of control applications such as pay-for-view TV control. When data processor 14 is released from a reset condition, it first addresses memory locations either contained within the integrated circuit portion 11 or within an external memory of peripheral portion 12, depending on how the system is configured. Data processor 14 receives instructions and data for initializing registers (not illustrated) internal to data processor 14. Once the initialization process is complete, data processor 14 executes instructions by addressing memory external to the integrated circuit portion 11 of system 10, for the purpose of controlling peripherals, either internal or external to the integrated circuit portion of data processing system 10, that enables viewing of TV programs in accordance with predetermined guidelines or permissions.

In operation, system 10 of FIG. 1 is generally operating in one of three modes. The first of the three operational modes is a "single chip mode". The single chip mode of operation requires data processor 14 to address predetermined memory locations of memory 13 via address bus 22 for the purpose of either reading instructions and data from memory 13 or writing data to memory 13. Predetermined addresses are provided at an address output of data processor 14, while data and instructions are coupled to each of memory 13 and data processor 14 by data/instruction bus 24. The single chip mode is characterized by the fact that only memory 13 and data processor 14, along with address bus 22 and data/instruction bus 24 are utilized.

A second mode of operation of system 10 is an "expanded mode". In the expanded mode of operation, data/instruction bus 30 is coupled to data/instruction bus 24 by the instruction inhibit circuit 18, which is effectively transparent in expanded mode operation. In the expanded mode of operation, data processor 14 can access either memory 13 or peripheral portion 12 for both instructions and data. Expanded mode operation utilizes memory 13, data processor 14, address bus 22, data/instruction bus 24, data/instruction bus 30 and instruction inhibit circuit 18. Since expanded mode operation allows data processor 14 to read instructions from peripheral portion 12, the instructions presented to data processor 14 via data/instruction buses 24 or 30, may be readily observed or interrupted for the purpose of reading or modifying the contents of memory 13; therefore the expanded mode of operation is not secure.

A third mode of operation of system 10 is a "secure mode". The secure mode of operation affects the interaction of memory 13, data processor 14, decoder 16, programmable security device 20, address bus 22, data/instruction buses 24 and 30, and control buses 26 and 28 which are contained within integrated circuit package portion 11 and peripheral portion 12 contained within data processing system 10.

Figure 2:
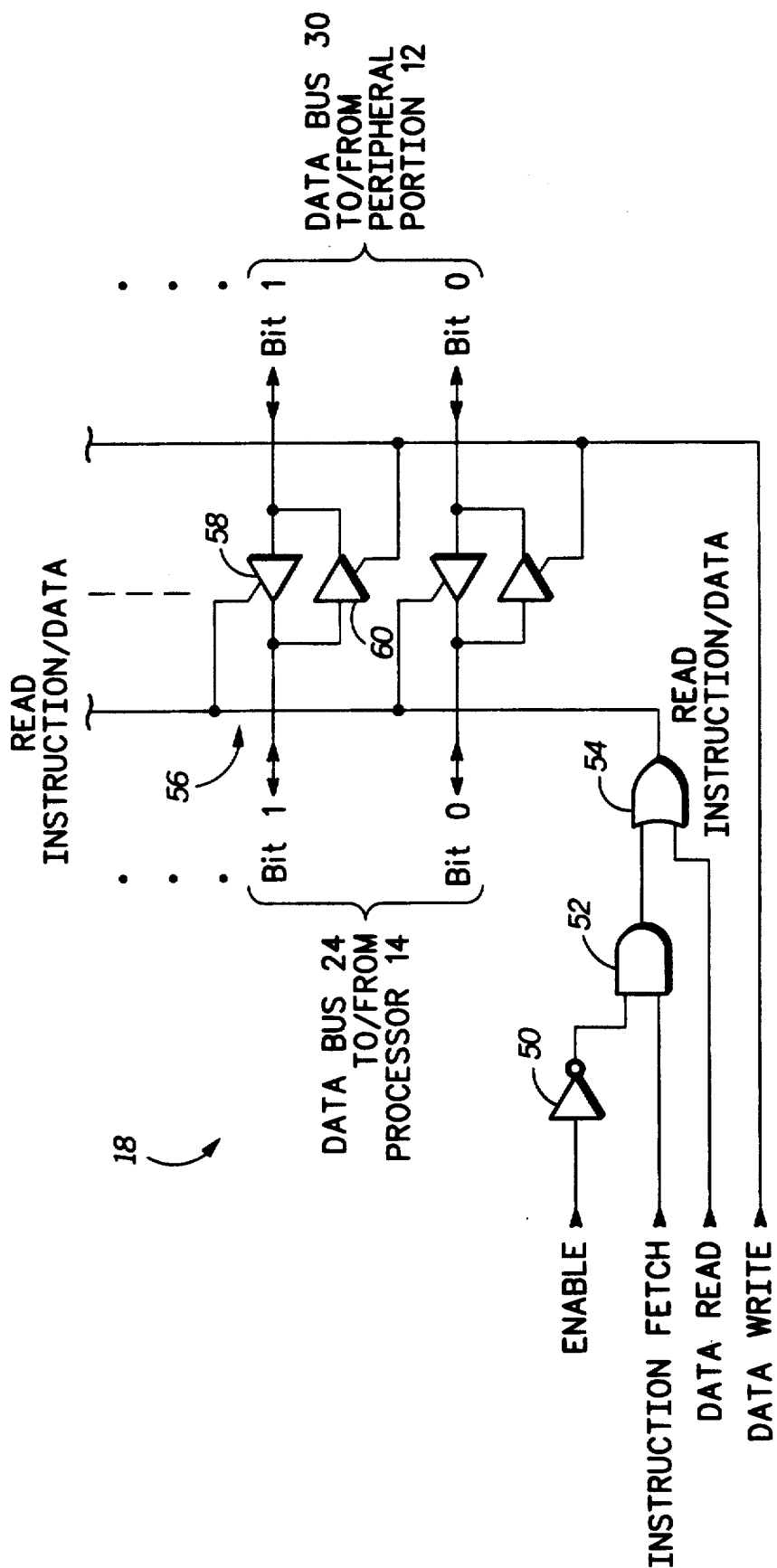
FIG. 2 illustrates in logic diagram form the instruction inhibit circuitry of the data processing system of FIG. 1.

Illustrated in FIG. 2 is a logic diagram of the instruction inhibit circuit 18 of FIG. 1 and generally comprising an inverter 50, an AND gate 52, an OR gate 54 and one or more pair of isolation buffers such as an isolation buffer pair 56 comprising buffers 58 and 60. An input of inverter 50 receives the Enable signal from programmable security device 20 of FIG. 1. A first input of AND gate 52 is connected to an output of inverter 50, and a second input of AND gate 52 is connected to the Instruction Fetch signal of decoder 16 of FIG. 1. A first input of OR gate 54 is connected to an output of AND gate 52, and a second input of OR gate 54 is connected to the Data Read signal contained within control bus 26 of FIG. 1. An output of OR gate 54 provides an output signal labeled "Read Instruction/Data". Each isolation buffer pair, such as buffers 58 and 60, has a first control input for receiving the Read Instruction/Data signal and a second control input for receiving the Data Write signal. Each isolation buffer pair is connected to data/instruction bus 30 and data/instruction bus 24 of FIG. 1.

In operation, decoder 16 of FIG. 1 decodes control information from data processor 14 and provides an active high Instruction Fetch signal if data processor 14 is fetching an instruction. In the illustrated form, an active signal is a logic high signal. the Enable signal provided by programmable security device 20 is activated when the data processing system 10 of FIG. 1 is to operate in the secure mode in response to the Control signal. Programmable security device 20 may be implemented as any type of nonvolatile storage device meaning that the state of the Enable signal remains valid even if power is removed from data processing system 10. Therefore, in one form programmable security device 20 may be implemented with a nonvolatile memory. The isolation buffers of FIG. 2 are controlled by the combinational logic of inverter 50, AND gate 52, OR gate 54, by the Date Read and Data Write control signals provided by control bus 26, and by the Enable and Instruction Fetch control signals. The illustrated logic gates of FIG. 2 function to decode the received control signals. When the Data Write signal of FIG. 2 is active, each of the isolation buffer pairs of FIG. 2 connects a predetermined data bit from data/instruction bus 24 to data/instruction bus 30. When the Data Read signal is active, data from data/instruction bus 30 is connected to data/instruction bus 24. When the Instruction Fetch signal of FIG. 2 is active and the Enable signal is inactive, instructions from data/instruction bus 30 are connected to data/instruction bus 24. When the Enable signal is active, instructions are read only from memory 13 and the isolation buffers of FIG. 2 are switched off to provide isolation between data/instruction buses 24 and 30. Further, when the Enable signal is active, instructions present on data/instruction bus 24 are non-interruptible and non-visible from outside the single integrated circuit package portion 11 of FIG. 1. Since the instructions present on data/instruction bus 24 are isolated from data/instruction bus 30, the single integrated circuit package portion 11 of FIG. 1 is operating in a secure mode.

It should be well understood that information residing in the memory of microcontrollers can be of a proprietary nature. The need to prevent access to this information is a major concern in many system designs. The secure mode of operation is a mix between the single chip and the expanded modes of operation. In the secure mode of operation, instruction read cycles performed by the data processor are confined to the data processor as in the single chip mode, whereas data reads and writes initiated by the data processor can be made either internal or external to the data processor in an expanded mode of operation. The secure mode of operation provided herein is an effective and economical solution to isolate instruction information of a data processor while allowing the data processor to read or write non-proprietary data external to the data processor. It should also be apparent that other operations than the operations detailed herein may be performed within system 10 during each of the single chip and expanded modes of operations. Therefore, the present invention may be considered as having a plurality of single chip modes and expanded modes of operation. However, regardless of the variety of operations considered permissible within a single chip or expanded mode of operation, the functionality of the secure mode insures that memory 13 may not be read or modified by unauthorized sources external to the single integrated circuit package.

By now it should be apparent that there has been provided a data processor with memory having a programmable controlled security feature. There are many additional configurations for implementing the invention described above. For example, the memory device in FIG. 1 could include volatile as well as non-volatile memory or combinations thereof. Multiple memory devices may be used. Memory management circuits may be included within the microcontroller. System 10 may be implemented with separate data and instruction buses. Multiple internal and external peripheral devices may be added and a variety of peripheral devices may be utilized. Inhibit circuit 18 or decoder 16 may be integrated within data processor 14, and any memory device may be used for programmable security device 20 including fusible links. The logic gates and isolation buffers of FIG. 2 could include further decoding to define a limited address range of data accesses. The isolation buffers may be implemented using MOS, bipolar, or any other types of transistors.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

What is claimed is:

1. An integrated circuit microcontroller comprising:
a data processor;
an address bus coupled to the data processor;
a data bus coupled to the data processor; a control bus coupled to the data processor for carrying a data write control signal and a data read control signal provided by the data processor;
a memory coupled to the address bus and to the data bus;
instruction fetch sensing means coupled to the data processor for determining when the data processor is fetching an instruction and for activating an instruction fetch control signal when the data processor is fetching an instruction;
a programmable security device for providing a secure mode enable signal in response to a control signal when the microcontroller is to operate in a secure mode, and
an external bus interface coupled to the address bus and to the data bus and coupled to receive the instruction fetch control signal and the secure mode enable signal, the external bus interface further comprising:
a plurality of bi-directional buffers, each bi-directional buffer having a first data terminal connected to a bit of the data bus, a second data terminal connected to a bit of an external data bus, a first control input coupled to receive said data write control signal from the data processor and a second control input coupled to receive a read control signal, each of the plurality of bi-directional buffers further comprising:
i) first buffer means having an input coupled to said bit of the data bus, an output coupled to said bit of the external data bus and a control input coupled to receive the data write control signal, the first buffer means is for coupling the input to the output when the data write control signal is active; and
ii) second buffer means having an input coupled to said bit of the external data bus, an output coupled to said bit of the data bus and a control input coupled to receive the read control signal, the first buffer means is for coupling the input to the output when the read control signal is active; and
logic means having a first input coupled to receive the secure mode enable signal, a second input coupled to receive the instruction fetch control signal, a third input coupled to receive said data read control signal from the data processor and an output for producing the read control signal, the logic means is for producing an active read control signal if the data read control signal received from the data processor is active or, if the instruction fetch control signal is active and the secure mode enable signal is inactive, but not for producing said active read control signal if the instruction fetch control signal is active and the secure mode enable signal is also active, whereby the data processor is prevented from fetching an instruction external to the microcontroller.

2. An integrated circuit microcontroller according to claim 1 wherein the programmable security device further comprises: a non-volatile memory.

* * * * *